Aug. 28, 1951
A. J. ANSAR
2,565,837
PICKUP DEVICE HAVING A FORCE TRANSMITTING
CARRIER LINK OF VISCOUS MATERIAL
Filed April 22, 1947
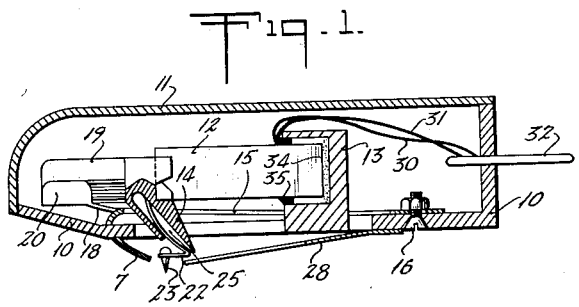
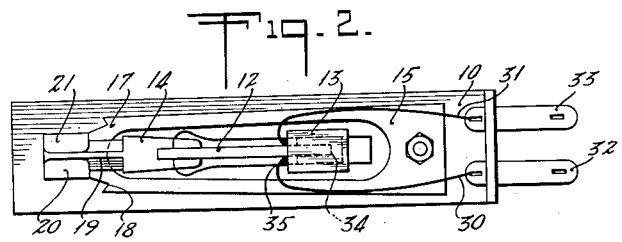
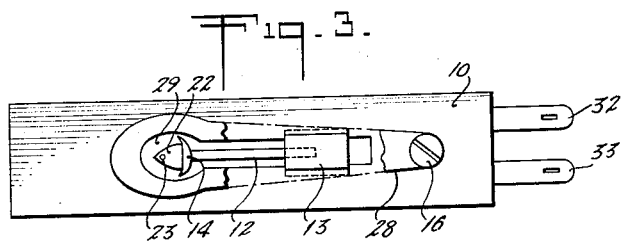
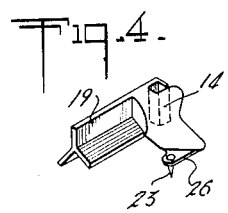
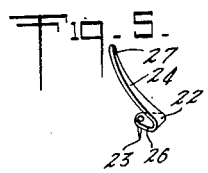
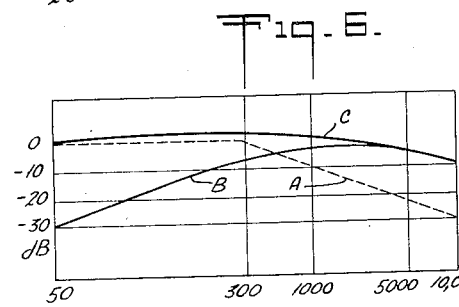
INVENTOR
Andrew John Ansar
BY
Javis C. Marble
His ATTORNEY Patented Aug. 28, 1951

2,565,837

UNITED STATES PATENT OFFICE 2,565,837

PICKUP DEVICE HAVING A FORCE TRANSMITTING CARRIER LINK OF VISCOUS MATERIAL

Anders Johan Ansar, Nykoping, Sweden

Application April 22, 1947, Serial No. 743,026
In Sweden May 3, 1944

Section 1, Public Law 690, August 8, 1946
Patent expires May 3, 1964

3 Claims. (Cl. 179—100.41)

For good reproduction and for satisfying other reasonable demands on a pick-up for commercial use the following main rules should be regarded. The output voltage when reproducing for instance a frequency record, that is a record made with variable frequency but constant amplitude on the input electrical voltage, should be substantially constant for frequencies up to at least 5,000 cycles a second. The output voltage further should be sufficient for full control of a normal audio frequency amplifier, such as for instance is usually used in radio receivers. The needle pressure further should be low, so that the wearing of the records and the needle point is decreased. Normally it is presumed that the needle pressure should be of the magnitude of 30 grams or less which requires a small mass and relatively little stiffness of the oscilating parts of the pick-up.

Due to their small weight and the resultant possibility of keeping the needle pressure down, piezoelectrical crystals have found use especially for pick-ups. These are made subject to a torsion- or bending effect and then give off an electrical voltage which with respect to magnitude and frequency is dependent on the mechanical strain on the crystal. However, piezoelectrical crystals have properties making them suitable for satisfying the above mentioned demands with respect to the fidelity characteristic.

Gramophone records of the common type are recorded with electromagnetic or electrodynamic engraving devices, which give a sideward movement of the engraving needle substantially proportional to the input voltage. The amplitudes of the engraved groove, consequently, are inversely proportional to the frequency. Therefore, at low frequencies the amplitude would be especially high but here one introduces special limiting arrangements, usually active at frequencies below some 300 cycles a second, where the amplitude is suppressed more or less depending upon amongst others the available groove space. A frequency record according to this engraving method will obviously give a constant speed of movement of the pick-up needle except within the above mentioned lower frequency range where the amplitude is kept substantially constant. Some elements, for instance piezoelectric crystals, which transform mechanical movement or strain into an electric voltage, give, however, a voltage proportional to the mechanical strain.

This means principally that the voltage is proportional to the amplitude of the record. A pick-up of the common type with crystal element will, therefore, produce a substantially constant voltage up to some 300 cycles a second, because the amplitude in the grooves is constant up to this periodicity. Above the said limit frequency the voltage will drop with increased frequency, due to the decrease in amplitude. As a rule the attenuation will be up to 6 decibels an octave.

It is obvious that a pick-up where the output voltage varies so strongly is not well suited to satisfy the above mentioned demands. The present invention, however, relates to pick-up, devices, preferably of piezoelectric type in which an essentially more constant voltage transformation is obtained and in which in the best case even a practically constant voltage transformation may be obtained over the whole frequency range in question. In connection with the needle and the crystal fixture there is thus according to the invention introduced a carrier link containing a fluid or a semi-fluid medium, for instance oil of such a kind that the transformation ratio between the movement of the needle carrier and the voltage creating movement of the crystal is greater at higher frequencies than at lower frequencies. Such medium will be referred to generically in the appended claims as a viscous medium.

The invention is further described in connection with the attached drawing, further details of the invention also being mentioned. In the drawing Figs. 1, 2 and 3 show a pick-up device according to the present invention in section and seen from the side, seen from above and seen from below, respectively. Figs. 4 and 5 show details of the invention and Fig. 6 contains a number of diagrams for explaining the function of the invention.

The frame of the pick-up is designated 10 in the drawing, its covering 11 and the crystal 12. The crystal is fixed to the back crystal fixture 13 in a manner which will be evident from the following further description of the invention and is also fixed to the front crystal fixture or the needle fixture 14. The crystal fixture 14 thus also forms the connection to the pick-up needle. It is carried in a manner further described by means of a spring 15 which by means of a screw 16 is fixed to the frame 10 of the pick-up. The spring 15 is so formed and dimensioned that it bears by means of two bent down points 17 and 18 on the frame 10 with a pressure which should normally exceed the needle pressure by one or some few tens of grams. The combined needle and crystal fixture 14 which in Fig. 1 is partly shown in section and in Fig. 4 in inclined front view, preferably is made of some kind of suitable synthetic material, for instance a synthetic resin. The foremost part 19 of the needle fixture is made with Y-shaped section as is evident from Fig. 4. Thus the needle fixture will to some extent be turnable by torsion about its longitudinal axis. The part of the needle fixture which is Y-shaped in section is carried by means of two bent over flanges 20 and 21 on the spring 15. The needle 22 is suitably made of thin steelplate or bronzeplate, and is provided with a needle point 23 which is assumed to be of permanent material, as for instance sapphire. In Fig. 5 it is shown in inclined back view.

From Fig. 1 it is further evident how the needle is combined with the needle fixture. The slightly bent part 24 of the needle is placed in an opening 25 in the needle fixture so that the two corners of the shoulder-formed part 26 are in pressure contact with the side surface of the opening 25 in the needle fixture. The point of the needle 22 stretching furthest into the opening 25 is in the drawing indicated 27. Under the frame 10 a protective covering 28 is arranged which is provided with an opening 29 intended partly to allow the needle point to penetrate so that it may contact the record which is to be reproduced, partly also to make adjustment possible in a manner further described.

The sideward movement of the needle fixture is limited by giving the opening 29, see Fig. 3, in the frame 10 a suitably limited lateral dimension. The conducting surfaces of the crystal element 12 are electrically connected by conductors 30 and 31 to connection terminals 32 and 33, respectively.

According to the present invention the crystal element is combined with the crystal fixture 13 by means of a carrier link comprising fluid or semifluid medium. In the arrangement according to the invention this medium is applied between the crystal 12 and the crystal fixture 13, and in the drawing (Figs. 1 and 2) it is indicated 34. The fluid or semifluid medium preferably consists of oil, absorbed by some material functioning as a wick, for example extremely fine cotton, very porous paper or the like. Advantageously a ring or layer 35 of rubber or caoutchouc may further be applied in some place between the crystal 12 and the crystal fixture 13. The function will be evident from the following description.

Earlier, as a rule, the crystal was fixed to the crystal fixture by means of an intermediate layer of rubber or similar material. Consequently, the mechanical motion of the crystal was reproduced in the form of electrical voltages with an amplitude, which was directly proportional to the mechanical oscillation amplitude of the crystal. When reproducing a frequency record according to the above, with this type of arrangement, a reproduction according to the curve A in Fig. 6 was obtained, the frequency being plotted along the horizontal axis and the output voltage in decibels along the vertical axis of Fig. 6. Within the frequency range up to about 300 per./sec. the voltage is constant, due to the constant amplitude of the grooves in the frequency record. At higher frequencies, however, an essential damping will be obtained due to the groove amplitude decreasing with increased frequency.

However, if the fixing of the crystal in the crystal fixture is made by means of a medium which gives different resistances to the turning movement of the element at different frequencies one may give the curve A of Fig. 6 another form. If the space between the crystal and the crystal fixture is for instance filled with oil, a greater resistance is obtained against turning at higher frequencies than at lower frequencies and consequently the output voltage will increase with rising frequency, because a greater part or all of the total turning movement will then be taken up by the crystal as a deformation movement, while a small part or no part at all of the total turning movement will be taken up by the oil layer, and this action will be emphasized the higher the frequency is.

Consequently the fidelity curve may be reproduced as the curve B of Fig. 6 provided that there is only an intermediate layer of oil. However, from Fig. 6 it is evident that a rather essential improvement of the fidelity is obtained for higher frequencies, but that the whole fidelity is not good. The reproduction level of oscillations of lower frequencies, however, may be improved by connecting mechanically in parallel with the oil layer an interposed layer of rubber or similar material in a manner known per se. However, this layer of rubber or similar mateial should be softer than what was previously usually used. It is also possible to introduce as a supporting material for the oil some kind of material, which is flexible to such an extent that it compensates the function of the said layer of rubber or similar material. In this way a combined action will be obtained, in consequence of which the intermediate layer of rubber will give a frequency curve, approximately as the curve A, and the intermediate layer of oil will give another frequency curve, substantially corresponding to curve B, and consequently the total fidelity curve will be about the same as the one shown in Fig. 6 with the figure C.

The curves of Fig. 6 are to some extent schematic. In practice the curves are not running too evenly, but in principle they increase and decrease correspondingly with the curves of Fig. 6. In practical tests it has been proved that one can, by means of the present invention, without any difficulty keep the total variation of output voltage from the pick-up within 3 decibels within a range of frequencies from 50 to 6500 per./sec.

In a pick-up of the type hitherto used, the lower frequencies are those which cause the greatest strain on the sensitive crystal element and the element has therefore to be dimensioned with regards to these strongest strains. On the other hand, the bending of the crystal element in a pick-up will be about the same throughout all of the frequency range and therefore, this bending will be substantially less than in hitherto used constructions. Because of this it is possible to decrease the dimensions of the crystal element, and in consequence thereof there is obtained a better flexibility and less inertia in the crystal element, both facts aiding to cause less wear of the needle point as well as of the records. A pick-up according to the invention, therefore, is particularly useful in combination with a reproducer needle of permanent type, for instance a needle with a sapphire point, as mentioned above in the detailed description of the invention. Further, smaller dimensions of the crystal element also enable a smaller and lighter construction of other parts of the pick-up to be employed, the total pressure thereby being decreased and in consequence thereof also the contact pressure of the pick-up on the record is decreased.

Further the mean level of the output voltage may be kept higher than in usual constructions, because, as mentioned above, the great strains on the crystal element at oscillations of lower frequencies are eliminated. In practice, this increase of the mean level is best obtained by making the distance between the needle point and the oscillation center of the oscillatory movement essentially less than was hitherto usual, thereby correspondingly increasing the amplitude of movement of the crystal element.

As mentioned above, it is essential to this invention, that in some place between the needle and the crystal fixture an intermediate link is coupled, containing a fluid or seim-fluid medium. Even if for different reasons it is most suitable to connect this intermediate link between the crystal and the crystal fixture, it may of course also be connected in other places, for instance between the needle fixture and the crystal.

It is not of importance to this invention whether the crystal through the mechanical movement of the needle is exposed to torsional or bending strains. Obviously, the invention may be used in both cases.

However, from the above discussion it is evident that the fidelity characteristic for the pick-up may be made practically horizontally linear by combining two different components, one of them containing the fluid or half-fluid transferring medium and the other one containing the more fixed medium, which may for instance be rubber or caoutchouc. Through this it is also evident that the final fidelity characteristic is determined by the dimensioning of the two transferring mediums acting in parallel. However, it may be difficult in any separate case to dimension these transferring means fully correctly and for this reason it is suitable that at least one of the transferring means is adjustable with respect to its action. This adjustment is obtained in the arrangement according to the present invention by displacing the crystal element, the needle fixture and the needle in their longitudinal direction, so that they enter the crystal fixture more or less deeply. The free part of the crystal may thus be lengthened, that part of the crystal which is in contact with the fluid or semi-fluid medium being shortened and consequently the resistance against movement from the fluid or seim-fluid medium being decreased.

From a practical point of view it may in some cases be less desirable to allow the movement between the crystal and the crystal fixture. In such cases, however, the active surface of the oil layer may be varied with practically satisfying result by displacement of the above mentioned oil containing material, which may for instance be blotting paper.

However, it is of great importance that the crystal in the arrangement according to the present invention be applied in such a way that the flat crystal in the pick-up is positioned with its plane surface in vertical direction. If the pick-up should be dropped on the record being reproduced or if the needle should be handled in a poor manner, the crystal is protected against damage because it more easily follows the movement of the needle in vertical direction due to the abnormal strain. Thereby, the part of the crystal which is fixed in the crystal fixture is displaced in vertical direction, a movement which in no way affects the function of the fluid or semi-fluid medium as a means for improving the fidelity characteristic.

I claim:

1. A pick-up device comprising a piezo-electric crystal, a needle fixture caried thereby, a crystal fixture supporting said crystal, and a force transmitting carrier link comprising a layer of a viscous medium located between the crystal and the crystal fixture, the plane of said layer being substantially perpendicular to the direction of oscillating force transmission therethrough whereby the transfer ratio between the movement of the needle fixture and the voltage generating movement of the crystal is made greater at higher frequencies than at lower frequencies.

2. A pick-up device comprising a piezo-electric crystal, a needle fixture carried thereby, a crystal fixture supporting said crystal, and a force transmitting carrier link comprising a layer of a viscous medium carried by a body of absorbent material disposed in the oscillation path between the needle and the crystal fixture, said link being spaced from the place on the crystal at which force is applied by the needle and the plane of said layer being substantially perpendicular to the direction of oscillating force transmission therethrough, whereby the transfer ratio between the movement of the needle fixture and the voltage creating movement of the crystal is made greater at higher frequencies than at lower frequencies.

3. A pick-up device comprising a piezo-electric crystal, a needle fixture carried thereby, a crystal fixture supporting said crystal, and a force transmitting carrier link comprising a layer of a viscous medium disposed in the oscillation path between the needle and the crystal fixture and a layer of relatively soft and resilient solid material arranged in parallel with said layer of viscous medium in respect of the direction of oscillating force transmission therethrough, said link being spaced from the place on the crystal at which force is applied by the needle and the plane of said layer being substantially perpendicular to the direction of oscillating force transmission therethrough, whereby the transfer ratio between the movement of the needle fixture and the voltage creating movement of the crystal is made greater at higher frequencies than at lower frequencies.

ANDERS JOHAN ANSAR.

REFERENCES CITED

The following references are of record in the file of this patent:

UNITED STATES PATENTS

| Number | Name | Date |
| --- | --- | --- |
| 526,865 | Libbey | Oct. 2, 1894 |
| 1,583,416 | Moore | May 4, 1926 |
| 1,669,170 | Nicholson | May 8, 1928 |
| 1,977,433 | Dunning | Oct. 16, 1934 |
| 2,313,129 | Dohan | Mar. 9, 1943 |
| 2,381,861 | Bauer | Aug. 14, 1945 |